United States Patent
Pearlstein et al.

(10) Patent No.: US 8,760,574 B2
(45) Date of Patent: Jun. 24, 2014

(54) IMAGE PROCESSING METHODS AND SYSTEMS FOR FRAME RATE CONVERSION

(75) Inventors: Larry Pearlstein, Newtown, PA (US); Samir Hulyalkar, Newtown, PA (US)

(73) Assignee: Broadcom Corporation, Irvine, CA (US)

(*) Notice: Subject to any disclaimer, the term of this patent is extended or adjusted under 35 U.S.C. 154(b) by 1396 days.

(21) Appl. No.: 12/433,686

(22) Filed: Apr. 30, 2009

(65) Prior Publication Data

US 2009/0273710 A1 Nov. 5, 2009

Related U.S. Application Data

(60) Provisional application No. 61/071,470, filed on Apr. 30, 2008.

(51) Int. Cl.
*H04N 7/01* (2006.01)

(52) U.S. Cl.
USPC .......................... 348/459; 348/441

(58) Field of Classification Search
USPC ............... 348/558, 571, 701, 441–459, 700; 382/300; 375/240.01, 240.16, 240.26
See application file for complete search history.

(56) References Cited

U.S. PATENT DOCUMENTS

| | | | |
|---|---|---|---|
| 7,075,581 B1 * | 7/2006 | Ozgen et al. | 348/448 |
| 7,224,734 B2 * | 5/2007 | Suzuki et al. | 375/240.2 |
| 7,349,029 B1 * | 3/2008 | Chou | 348/448 |
| 2004/0239803 A1 * | 12/2004 | Selby et al. | 348/459 |
| 2005/0094030 A1 * | 5/2005 | Brelay | 348/441 |
| 2005/0195325 A1 * | 9/2005 | Tanaka | 348/448 |
| 2007/0103589 A1 * | 5/2007 | Tanaka | 348/448 |
| 2007/0296870 A1 * | 12/2007 | Foret | 348/701 |
| 2008/0030614 A1 * | 2/2008 | Schwab et al. | 348/441 |
| 2008/0062307 A1 * | 3/2008 | Zhai et al. | 348/448 |
| 2008/0062308 A1 * | 3/2008 | Zhai et al. | 348/448 |

* cited by examiner

*Primary Examiner* — Michael Lee
(74) *Attorney, Agent, or Firm* — Foley & Lardner LLP; Christopher J. McKenna; Daniel Rose

(57) ABSTRACT

An image processing method for frame rate conversion, comprising: receiving a stream of input pictures at an input frame rate, at least some of the input pictures being new pictures, the new pictures appearing within the stream of input pictures at an underlying new picture rate; generating interpolated pictures from certain ones of the input pictures; outputting a stream of output pictures at an output frame rate, the stream of output pictures including a blend of the new pictures and the interpolated pictures, the interpolated pictures appearing in the stream of output pictures at an average interpolated picture rate; and causing a variation in the average interpolated picture rate in response to detection of a variation in the underlying new picture rate.

23 Claims, 3 Drawing Sheets

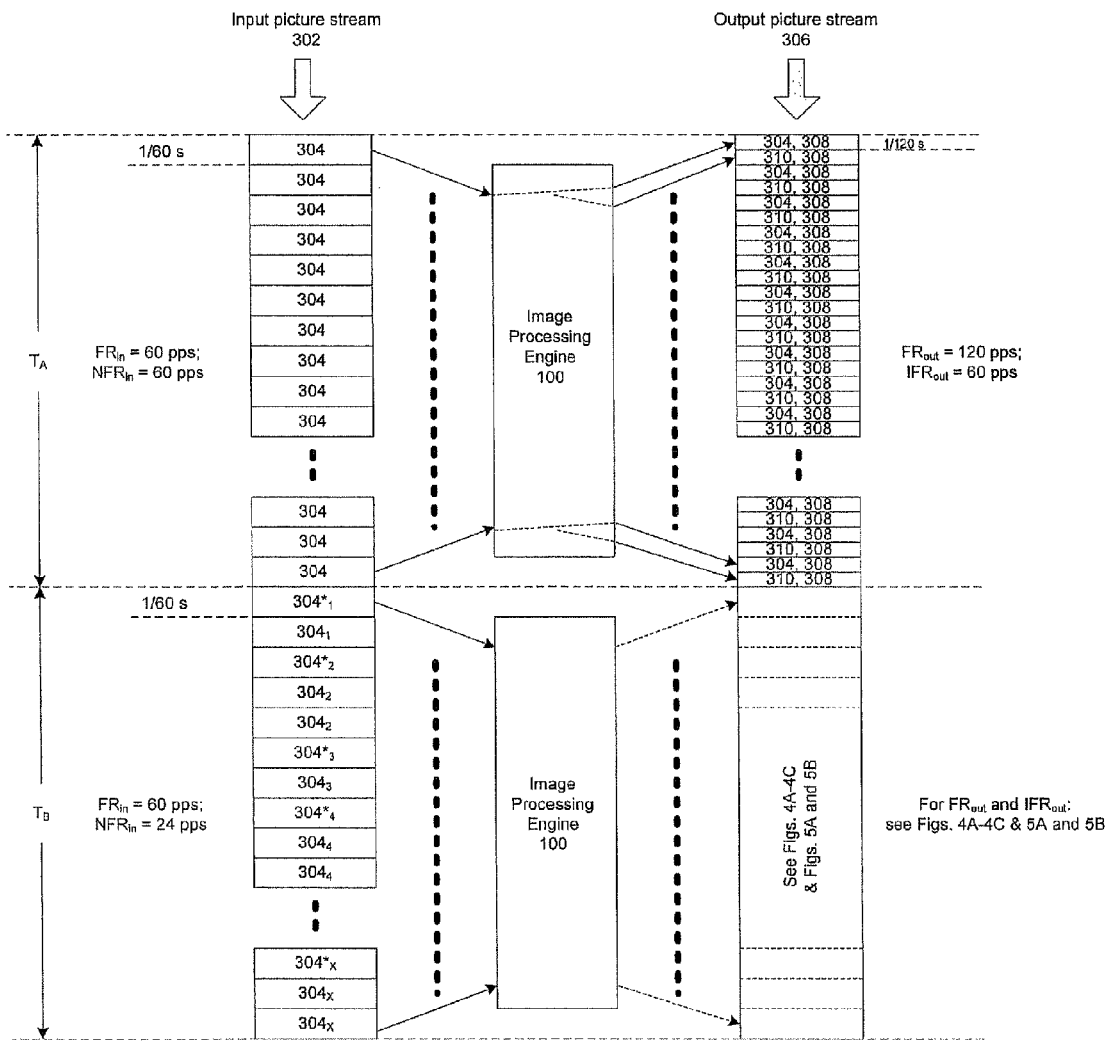

US 8,760,574 B2

IMAGE PROCESSING METHODS AND SYSTEMS FOR FRAME RATE CONVERSION

CROSS-REFERENCE TO RELATED APPLICATIONS/INCORPORATION BY REFERENCE

This patent application makes reference to, claims priority to and claims benefit from U.S. Provisional Patent Application Ser. No. 61/071,470 filed on Apr. 30, 2008.

The above stated application is hereby incorporated herein by reference in its entirety.

FIELD OF THE INVENTION

Certain embodiments of the invention relate to image processing. More specifically, certain embodiments of the invention relate to image processing methods and systems for frame rate conversion.

BACKGROUND OF THE INVENTION

Excellent motion portrayal is a strong characteristic of cathode ray tubes (CRTs) whereas it is a weakness in many pixelized displays. In particular, motion blur is a limitation of many liquid crystal displays (LCDs). Motion blur in LCDs is caused by various phenomena, one of which is the sample and hold principle of the LCD. Motion blur can be subjectively reduced by modulating the backlight of the display. However, this can introduce flicker. Another option for subjectively reducing motion blur is to increase the frame rate, known as frame rate conversion. This typically relies on a process known as temporal interpolation to create one or more new pictures for placement between two original pictures.

An input video signal whose frame rate is to be increased can consist of several segments of pictures originally taken using video, film and/or other media. For regular video content, which is characterized by the fact that every picture originates at a different moment in time, a 60 Hz input signal can be converted to, say, 120 Hz by placing a single interpolated picture temporally in the middle position between neighboring pictures in the input video signal. However, the situation is different for film material, as film is captured at 24 Hz and (for 60 Hz countries) up-converted by a 3:2 pull down cadence to give a 60 Hz signal. Simply placing a single interpolated picture between each picture of the 3:2 pull down 60 Hz signal to give a resulting output signal at the desired frame rate of 120 Hz would not lead to motion blur reduction at all, and the motion portrayal remains highly irregular in the output signal.

Thus, for film material, motion judder of the film cadence needs to be eliminated prior to up-conversion. This basically means that the 24 Hz original film material is up-converted to 120 Hz by placing 4 new interpolated pictures between neighboring 24 Hz original pictures. Since 80% of the output video now consists of interpolated pictures, the demands of the interpolator are increased. Moreover, perceived picture quality can be severely degraded due to the high proportion of time occupied by interpolated rather than original pictures.

Against this background, there is a need in the industry for a method and system for frame rate conversion based on temporal interpolation, but with improved picture quality and greater computational efficiency than conventional techniques.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

According to a first aspect, the present invention seeks to provide an image processing method for frame rate conversion, comprising: receiving a stream of input pictures at an input frame rate, at least some of the input pictures being new pictures, the new pictures appearing within the stream of input pictures at an underlying new picture rate; generating interpolated pictures from certain ones of the input pictures; outputting a stream of output pictures at an output frame rate, the stream of output pictures including a blend of the new pictures and the interpolated pictures, the interpolated pictures appearing in the stream of output pictures at an average interpolated picture rate; and causing a variation in the average interpolated picture rate in response to detection of a variation in the underlying new picture rate.

According to a second aspect, the present invention seeks to provide a computer-readable storage medium comprising computer-readable instructions for instructing a computing device to: receive a stream of input pictures at an input frame rate, at least some of the input pictures being new pictures, the new pictures appearing within the stream of input pictures at an underlying new picture rate; generate interpolated pictures from certain ones of the input pictures; output a stream of output pictures at an output frame rate, the stream of output pictures including a blend of the new pictures and the interpolated pictures, the interpolated pictures appearing in the stream of output pictures at an average interpolated picture rate; and cause a variation in the average interpolated picture rate in response to detection of a variation in the underlying new picture rate.

According to a third aspect, the present invention seeks to provide a computer-readable storage medium comprising computer-readable instructions which when processed are used to generate a processor/apparatus adapted to: receive a stream of input pictures at an input frame rate, at least some of the input pictures being new pictures, the new pictures appearing within the stream of input pictures at an underlying new picture rate; generate interpolated pictures from certain ones of the input pictures; output a stream of output pictures at an output frame rate, the stream of output pictures including a blend of the new pictures and the interpolated pictures, the interpolated pictures appearing in the stream of output pictures at an average interpolated picture rate; and cause a variation in the average interpolated picture rate in response to detection of a variation in the underlying new picture rate.

According to a fourth aspect, the present invention seeks to provide an image processing engine adapted to implement a frame rate conversion process that comprises: receiving a stream of input pictures at an input frame rate, at least some of the input pictures being new pictures, the new pictures appearing within the stream of input pictures at an underlying new picture rate; generating interpolated pictures from certain ones of the input pictures; outputting a stream of output pictures at an output frame rate, the stream of output pictures including a blend of the new pictures and the interpolated pictures, the interpolated pictures appearing in the stream of output pictures at an average interpolated picture rate; and causing a variation in the average interpolated picture rate in response to detection of a variation in the underlying new picture rate.

According to a fifth aspect, the present invention seeks to provide an image an image processing method for frame rate conversion, comprising: receiving a stream of first pictures at a first frame rate; generating interpolated pictures from the first pictures; outputting a stream of output pictures at an output frame rate, the stream of output pictures including a blend of the first pictures and the interpolated pictures, the interpolated pictures appearing in the stream of output pictures at an average interpolated picture rate; processing the first pictures to determine a likelihood of interpolation induced artifacts in the output pictures; adjusting the average interpolated picture rate based on said likelihood.

According to a sixth aspect, the present invention seeks to provide a computer-readable storage medium comprising computer-readable instructions for instructing a computing device to: receive a stream of first pictures at a first frame rate; generate interpolated pictures from the first pictures; output a stream of output pictures at an output frame rate, the stream of output pictures including a blend of the first pictures and the interpolated pictures, the interpolated pictures appearing in the stream of output pictures at an average interpolated picture rate; process the first pictures to determine a likelihood of interpolation-induced artifacts in the output pictures; and adjust the average interpolated picture rate based on said likelihood.

According to a seventh aspect, the present invention seeks to provide a computer readable storage medium comprising computer-readable instructions which when processed are used to generate a processor/apparatus adapted to: receive a stream of first pictures at a first frame rate; generate interpolated pictures from the first pictures; output a stream of output pictures at an output frame rate, the stream of output pictures including a blend of the first pictures and the interpolated pictures, the interpolated pictures appearing in the stream of output pictures at an average interpolated picture rate; process the first pictures to determine a likelihood of interpolation-induced artifacts in the output pictures; and adjust the average interpolated picture rate based on said likelihood.

According to an eighth aspect, the present invention seeks to provide an image processing engine adapted to implement a frame rate conversion process that comprises: receiving a stream of first pictures at a first frame rate; generating interpolated pictures from the first pictures; outputting a stream of output pictures at an output frame rate, the stream of output pictures including a blend of the first pictures and the interpolated pictures, the interpolated pictures appearing in the stream of output pictures at an average interpolated picture rate; processing the first pictures to determine a likelihood of interpolation induced artifacts in the output pictures; and adjusting the average interpolated picture rate based on said likelihood.

These and other aspects and features of the present invention will now become apparent to those of ordinary skill in the art upon review of the following description of specific embodiments of the invention in conjunction with the accompanying drawings.

BRIEF DESCRIPTION OF SEVERAL VIEWS OF THE DRAWINGS

FIG. 3 is a conceptual diagram illustrating the frame rate conversion process in accordance with a non-limiting embodiment of the present invention, whereby a stream of input pictures is converted into a stream of output pictures.

It is to be expressly understood that the description and drawings are only for the purpose of illustration of certain embodiments of the invention and are an aid for understanding. They are not intended to be a definition of the limits of the invention.

DETAILED DESCRIPTION OF THE INVENTION

Figure 1:
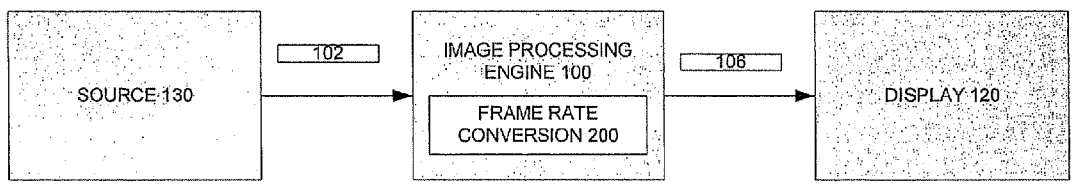
FIG. 1 is a block diagram showing an image processing engine in accordance with a non-limiting embodiment of the present invention.

Reference is made to FIG. 1, which shows an image processing engine 100 adapted to receive an input picture stream 102 from an image source 130 such as a picture buffer. The input picture stream 102 comprises a sequence of input pictures 104 at an input frame rate $FR_{in}$ in pictures per time unit (e.g., pictures per second, hereinafter abbreviated as "pps"). Among the input pictures 104, at least some of them are "new", while others may be non-new (or "repeated"). By a particular input picture being "new" it is meant that the particular input picture was captured at a unique instant in time. It should be appreciated that in some cases, all of the input pictures 104 in the input picture stream 102 may be new while in other cases two of the input pictures 104, say X and Y, can indeed be new but either X or Y is repeated once (or a greater number of times) and positioned between X and Y in the input picture stream 102. The image processing engine 100 receives the input picture stream 102 and produces therefrom an output picture stream 106, comprising a sequence of output pictures 108 at an output frame rate $FR_{out}$ in pictures per time unit (e.g., pps). The output picture stream 106 can be rendered on a display 120.

In one non-limiting embodiment, the image processing engine 100 can be implemented in an application-specific integrated circuit (ASIC) such as can be integrated into a television set, computer graphics processor or other electronic device. In another non-limiting embodiment, the image processing engine 100 can be implemented by programmable elements of a computing device such as a personal computer, mobile computer or mobile communication device. Other implementations will be apparent to those of skill in the art as being within the scope of the present invention.

Figure 2:
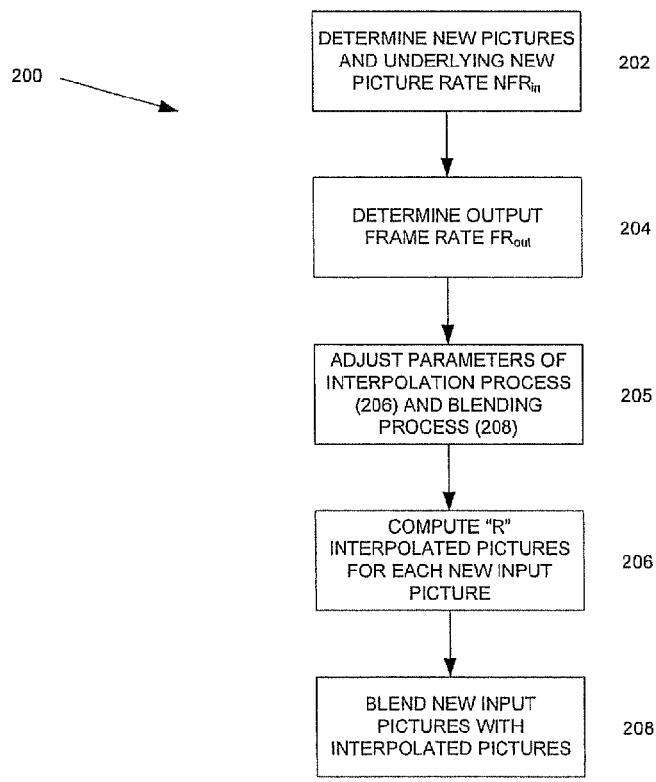
FIG. 2 is a flowchart that illustrates steps in a frame rate conversion process that can be executed by an image processing engine, in accordance with a non-limiting embodiment of the present invention.

The image processing engine 100 is configured to implement a frame rate conversion process 200, which can be viewed as a sequence of steps, some of which will now be described with additional reference to FIG. 2. It should be appreciated that in the present specification, the words "picture" and "frame" are used interchangeably.

At step 202, the image processing engine 100 is configured to determine, on an ongoing basis, which of the input pictures 104 are new and also to determine their rate in pictures per time unit (e.g., pps), which can be referred to as an underlying new picture rate and is hereinafter denoted $NFR_{in}$. Step 202 can be executed in a variety of ways, including implementing a cadence detection process such as that provided by the ABT2010 video processing chip available from Anchor Bay Technologies, Los Gatos, Calif. For the sake of notational convenience, those of the input pictures 104 found to be new are denoted 104*.

At step 204, the image processing engine 100 is configured to determine a suitable value of the output frame rate $FR_{out}$ that depends on a variety of factors. For example, in one embodiment, the value of the output frame rate $FR_{out}$ depends on the underlying new picture rate $NFR_{in}$ as a function of a pre-determined mapping. This mapping could quite simply indicate that the output frame rate $FR_{out}$ is related to the underlying new picture rate $NFR_{in}$ by an increasing function, such that increases in the underlying new picture rate $NFR_{in}$ will result in increases in the output frame rate $FR_{out}$, while decreases in the underlying new picture rate $NFR_{in}$, will result in decreases in the output frame rate $FR_{out}$. In a second example embodiment, the output frame rate FRout may be constrained to retain the same value during times where the underlying new picture rate $NFR_{in}$, may undergo transitions. In this case, there is no actual mapping between the underlying new picture rate $NFR_{in}$ and the output frame rate $FR_{out}$.

At step 206, the image processing engine 100 computes a number ("R") of interpolated pictures $110_{1...R}$ for each of the new input pictures 104*. The interpolated pictures $110_{1...R}$ for a particular one of the new input pictures 104* may be computed from that input picture as well as one or more other ones of the new input pictures 104* (and/or other ones of the input pictures 104) using anyone of a number of interpolation techniques. As a result, each of the new input pictures 104* will have associated with it a set of R corresponding interpolated pictures $110_{1...R}$. The value of R is hereinafter referred to as the "interpolation ratio" and is adjustable as will be described below. At step 208, the image processing engine 100 blends the new input pictures 104* together with the corresponding sets of interpolated pictures $110_{1...R}$ in accordance with a blending ratio of $P_N:P_I$. That is to say, each of the new input pictures 104* is repeated $P_N$ times, and then is followed by each of the R interpolated images $110_{1...R}$ being repeated $P_I$ times. One observes that each of the new input pictures 104* in the input picture stream 102 is responsible for the appearance of $P_N$ copies of itself in addition to $R \times P_I$ interpolated pictures in the output picture stream 106. Thus, the average number of new pictures 104* (or copies thereof) appearing in the output picture stream 106 per second is $NER_{in} \times P_N$, while the average number of interpolated pictures or copies thereof (i.e., pictures of an interpolated nature) appearing in the output picture stream 106 per second is $NFR_{in} \times R \times P_I$. The latter quantity can be referred to as an "average interpolated picture rate" and is denoted $IFR_{out}$. This corresponds to the number of pictures of an interpolated nature that a viewer of the output picture stream 106 is exposed to. The values of $P_N$ and $P_I$ are adjustable as will be described below.

In particular, advantage is taken of the fact that when the underlying new picture rate $NFR_{in}$ is higher, human visual systems can tolerate a higher average interpolated picture rate $IFR_{out}$ and likewise when the underlying new picture rate $NFR_{in}$ is lower, human visual systems can tolerate a correspondingly lower average interpolated picture rate $IFR_{out}$. Generally speaking, therefore, embodiments of the present invention aim to effect changes in the average interpolated picture rate $IFR_{out}$ that follow changes in the underlying new picture rate $NFR_{in}$.

To this end, at step 205, adjustments can be made to parameters of the interpolation (step 206) and blending (step 208) processes based on detected variations in the underlying new picture rate $NFR_{in}$ (determined at step 202) and based on the target output frame rate $FR_{out}$ (determined at step 204). Specifically, such adjustments or variations include:

adjustments to R (the number of interpolated pictures $110_{1...R}$ generated for each of the new input pictures 104*);

adjustments to $P_N$ (the number of times each of the new input pictures 104* is repeated in the output picture stream 106); and adjustments to $P_I$ (the number of times each of the R interpolated images $110_{1...R}$ corresponding to a particular one of the new input pictures 104* is repeated in the output picture stream 106).

The adjustments are made so that the average interpolated picture rate $IFR_{out}$ maps to an increasing function of the underlying new picture rate $NFR_{in}$. That is to say, increases in the underlying new picture rate $NFR_{in}$ lead to increases in the average interpolated picture rate $IFR_{out}$ while decreases in the underlying new picture rate $NFR_{in}$ lead to in decreases in the average interpolated picture rate $IFR_{out}$.

By way of specific non-limiting example, and with reference to FIG. 3, consider the case where during a time interval denoted A, an input picture stream 302 with a plurality of input pictures 304 has an input frame rate of $FR_{in}$=60 pps and an underlying new picture rate of $NFR_{in}$=60 pps; in other words, each of the 'input pictures 304 is new. Consider that the image processing engine 100 indeed determines at step 202 that the underlying new picture rate $NFR_{in}$=60 pps and, at step 204, maps this value to a target output frame rate of $FR_{out}$=120 pps.

In order to achieve this value of the output frame rate $FR_{out}$ from the measured underlying new picture rate $NFR_{in}$, let it be assumed that execution of step 205 yields certain values of R, $P_N$ and $P_I$ such that at step 206, the image processing engine 100 generates one interpolated picture 310 for each new input picture 304 (i.e., R=1), and at step 208, the image processing engine 100 blends the new and interpolated pictures 304, 310 in a ratio (hereinafter referred to as a "blending ratio") of $P_N:P_I$=1:1. This yields an output picture stream 306 comprising output pictures 308 where, out of every group of 120 output pictures 308 per second, half of them will have been of the interpolated variety, i.e., the average interpolated picture rate $IFR_{out}$ is 60 pps.

Consider now that during the next time interval denoted B, the underlying new picture rate changes (drops) to $NFR_{in}$=24 pps. Meanwhile, the input frame rate $FR_{in}$ may have stayed the same or may have varied; to a certain extent, the input frame rate $FR_{in}$ is irrelevant. For illustrative purposes, take the case where the input frame rate $FR_{in}$ stays the same at 60 pps, the input picture stream 302 could now consist of a first new picture 304*₁, a repeated version of the first new picture 3041, a second new picture 304*₂, two repeated versions of the second new picture 3042, 3042, a third new picture 304*₃, a repeated version of the third new picture 304₃, and so on. Thus, 24 new input pictures 304 per second result in the input frame rate $FR_{in}$ being equal to 12×2+12×3=60 pps. The underlying new picture rate $NFR_{in}$ is again detected by the image processing engine 100 at step 202. Then at step 204, the image processing engine 100 maps the input frame rate $NFR_{in}$=24 pps to a suitable output frame rate $FR_{out}$. Suitable but non-limiting examples include $FR_{out}$=48 pps, $FR_{out}$=72 pps and $F_{out}$=120 pps. In the latter case, there is no change in the output frame rate $FR_{out}$ between time intervals A and B. Thus, the output frame rate $FR_{out}$ may be varied or kept constant.

At step 205, the image processing engine 100 is now faced with the prospect of varying the parameters of the blending and interpolation processes. To this end, the image processing engine 100 may vary R, the number of interpolated images generated for each of the input images, from its previous value of 1. In addition $P_N$ (the number of times each new input picture is repeated in the output picture stream 306) and $P_I$ (the number of times each of the R interpolated pictures generated for each new input picture is repeated in the output picture stream 306) may be varied from their previous values of 1 and 1 (which gave a blending ratio of 1:1). As will be seen from the examples below, each possible tweaking of parameters in response to the lower value of the underlying new picture rate $NFR_{in}$ (which has dropped from 60 pps to 24 pps) will cause the average interpolated picture rate $IFR_{out}$ to drop from its previous value of 60 pps.

Figure 4A:
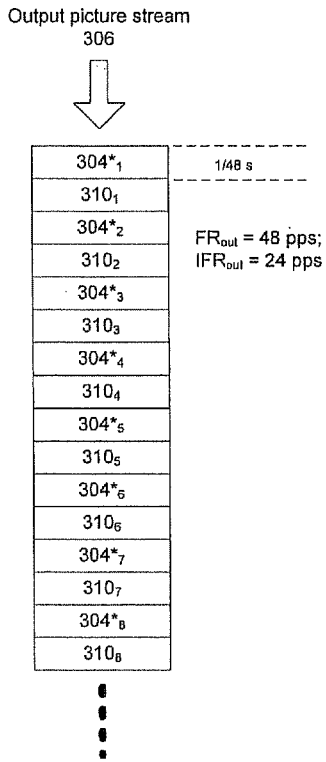
FIGS. 4A-4C show details of the effect of the frame rate conversion process in accordance with non-limiting embodiments of the present invention when the rate of output pictures is caused to vary.
Figure 4B:
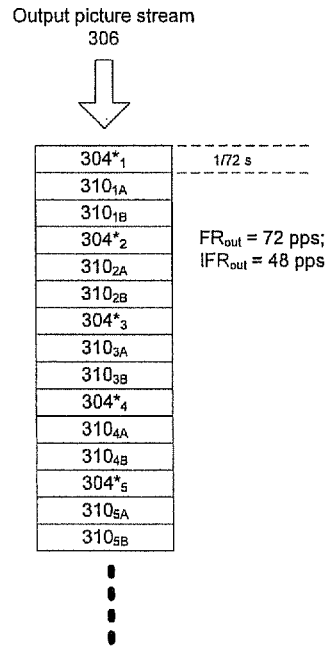
Figure 4C:
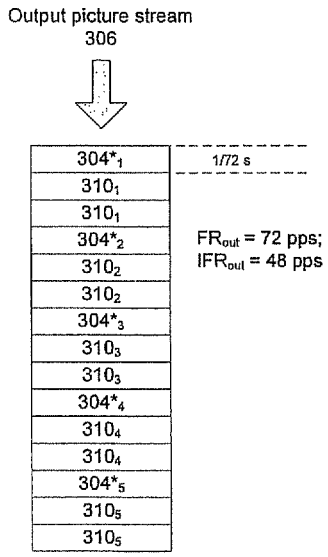

To this end, reference is made to FIGS. 4A to 4C, which illustrate three Scenarios entitled IA, IB and IC, and which are all associated with parameter adjustments that can be made when the output frame rate $FR_{out}$ (obtained at step 204) was lowered (e.g., to either 48 pps or 72 pps, depending on the embodiment, all of which are non-limiting). Specifically:

- In Scenario IA (FIG. 4A), R is kept constant, as is the blending ratio $P_N:P_I$. Thus, each new input picture 304$*_j$ is blended with a corresponding interpolated picture 310$_j$.
- In Scenario IB (FIG. 4B), R is varied (in this case, increased to a value of 2), while the blending ratio $P_N:P_I$ is kept constant. Thus, each new input picture 304$*_j$ is blended with two corresponding interpolated pictures 310$_{j_A}$, 310$_{j_B}$.
- In Scenario IC (FIG. 4C), R is kept constant, while the blending ratio $P_N:P_I$ is varied (in this case, changed to 1:2). Thus, each new input picture 304$*j$ is blended with two copies of a single corresponding interpolated picture 310$_j$.

|  | A | Time Interval B (scenario IA) | Time Interval B (scenario IB) | Time Interval B (scenario IC) |
|---|---|---|---|---|
| $FR_{in}$ (* = irrelevant) | 60* | 60* | 60* | 60* |
| $NFR_{in}$ | 60 | 24 | 24 | 24 |
| $FR_{out}$ (=f($NFR_{in}$)) | 120 | 48 | 72 | 72 |
| $FR_{out}/NFR_{in}$ | 2 | 2 | 3 | 3 |
| R | 1 | 1 | 2 | 1 |
| $P_N$ | 1 | 1 | 1 | 1 |
| $P_I$ | 1 | 1 | 1 | 2 |
| $IFR_{out}$ (=R × $NFR_{in}$ × $P_I$) | 60 | 24 | 48 | 48 |

Figure 5A:
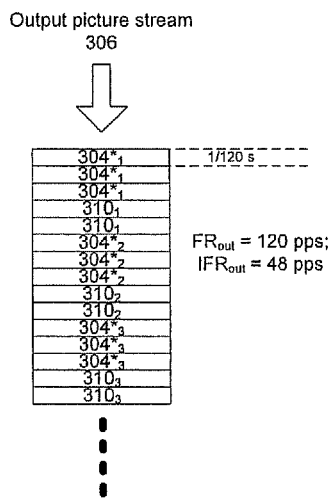
FIGS. 5A and 5B show details of the effect of the frame rate conversion process in accordance with non-limiting embodiments of the present invention when the rate of output pictures is caused to remain the same.
Figure 5B:
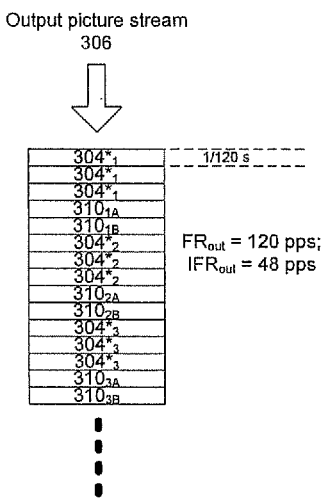

Reference is now made to FIGS. 5A and 5B, which illustrate two Scenarios entitled IIA and IIB, and which are both associated with parameter adjustments that can be made when the output frame rate $FR_{out}$ (obtained at step 204) was kept constant (i.e., at 120 pps). Specifically:

- In Scenario IIA (FIG. 5A), R is kept constant, while the blending ratio $P_N:P_I$ is varied (in this case, changed to 3:2). Thus, three copies of each new input picture 304$*_j$ are blended with two copies of a single corresponding interpolated picture 310$_j$.
- In scenario IIB (FIG. 5B), R is varied (in this case, increased to a value of 2), as is the blending ratio $P_N:P_I$ (in this case, changed to 3:1). Thus, three copies of each new input picture 304$*_j$ are blended with two corresponding interpolated pictures 310$_{j_A}$, 310$_{j_B}$.

|  | A | Time Interval B (scenario IA) | Time Interval B (scenario IB) |
|---|---|---|---|
| $FR_{in}$ (* = irrelevant) | 60* | 60* | 60* |
| $NFR_{in}$ | 60 | 24 | 24 |
| $FR_{out}$ (=f($NFR_{in}$)) | 120 | 120 | 120 |
| $FR_{out}/NFR_{in}$ | 2 | 5 | 5 |
| R | 1 | 1 | 2 |
| $P_N$ | 1 | 3 | 3 |
| $P_I$ | 1 | 2 | 1 |
| $IFR_{out}$ (=R × $NFR_{in}$ × $P_I$) | 60 | 48 | 48 |

It is therefore seen in all cases that as the underlying new picture rate $NFR_{in}$ decreases from 60 pps to 24 pps, so too does the average interpolated picture rate $IFR_{out}$ (from 60 pps to either 24 pps or 48 pps). As a result, a viewer of the output picture stream 306 is exposed to fewer pictures of an interpolated nature. Of course, when the underlying new picture rate $NFR_1$, increases, it is within the scope of the present invention to similarly increase the average interpolated picture rate $IFR_{out}$ thus presenting the viewer of the output picture stream with more pictures of an interpolated nature.

Also, it is noted that the number of interpolated pictures actually generated per second (namely, R×$NFR_{in}$) is lower during time interval B than during time interval A, even in those scenarios where the output frame rate $FR_{out}$ has been kept constant. Specifically, the number of interpolated pictures generated per second during time interval B corresponds to 24 or 48, depending on the Scenario, in comparison to 60 interpolated pictures generated during time interval A. This is to be compared with a less innovative approach where maintaining the output frame rate of $FR_{out}$=120 pps with a new underlying picture rate of $NFR_{in}$=24 pps during time interval B would require the generation of four (4) interpolated pictures for each new picture in the input picture stream 302, therefore increasing the number of interpolated pictures generated per second from 60 to 96, thereby engendering a corresponding increase in the computational load associated with the interpolation operation.

Those skilled in the art will also appreciate that not only can the average interpolated picture rate $IFR_{out}$ be increased/decreased in accordance with increases/decreases in the underlying new picture rate NFRin, but. it can also be varied in response to other factors detectable from the input picture stream 102. Specifically, the input picture stream 102 can be processed to determine a likelihood of perceptible interpolation-induced artifacts in the output pictures 108, based on the current values of the interpolation ratio R and the blending ratio $P_N:P_I$. For example, the image processing engine 100 can be responsive to indicators generated by various subsystems such as those responsible for pattern detection (which can signal an anomaly with pattern detection such as detection of a repetitive pattern), motion vector estimation (which can signal a lack of reliable motion vectors), to name a few non-limiting possibilities.

When the likelihood is determined to be above a certain first threshold, then it may be desirable to reduce the average interpolated picture rate $IFR_{out}$ in one of the ways described above that may, but does not necessarily, involve reducing the output frame rate $FR_{out}$. For example, possible adjustments involve variations in R (the number of interpolated images generated for each of the new input pictures 104*), $P_N$ (the number of times each of the new input pictures 104* is repeated in the output picture stream 106) and $P_I$ (the number of times each of the R interpolated images 108$_1 \ldots _R$ is repeated in the output picture stream 106) so that the average interpolated picture rate $IFR_{out}$ is decreased. The aforementioned changes may be gradual so as to result in a gradual decrease in the average interpolated picture rate $IFR_{out}$.

Likewise, when the likelihood of perceptible interpolation-induced artifacts in the output pictures 108 is determined to fall back below a certain second threshold (which could be the same as, or different than, the above first threshold), then it may be desirable to increase the average interpolated picture rate $IFR_{out}$ in one of the ways described above, while increasing or keeping stable the output frame rate $FR_{out}$.

It should be appreciated that the values of $FR_{in}$, $FR_{out}$, $NFR_{in}$ and the like were selected for exemplary purposes and do not represent limitations of the present invention. These parameters may have any suitable values in various embodiments, depending on specific operational requirements. In particular, it should be expressly understood that the present invention is applicable to input frame rates $FR_{in}$ and output frame rates $F_{out}$ of 25 pps and 50 pps, as well as underlying new picture rates $NFR_{in}$ of 25 pps and 50 pps, which result from the use of equipment originating from Europe and certain other regions of the world.

Those skilled in the art will appreciate that in some embodiments, the functionality of the image processing engine 100 may be implemented using pre-programmed hardware or firmware elements (e.g., application specific integrated circuits (ASICs), electrically erasable programmable read-only memories (EEPROMs), etc.), or other related components. In other embodiments, the functionality of the image processing engine 100 may be achieved using a computing apparatus that has access to a code memory (not shown) which stores computer-readable program code for operation of the computing apparatus, in which case the computer-readable program code could be stored on a medium which is fixed, tangible and readable directly by the image processing engine 100, (e.g., removable diskette, CD-ROM, ROM, fixed disk, USB drive), or the computer-readable program code could be stored remotely but transmittable to the image processing engine 100 via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof.

While specific embodiments of the present invention have been described and illustrated, it will be apparent to those skilled in the art that numerous modifications and variations can be made without departing from the scope of the invention as defined in the appended claims.

The invention claimed is:

1. An image processing method for frame rate conversion, comprising:
   receiving a stream of input pictures at an input frame rate, at least some of the input pictures being new pictures, the new pictures appearing within the stream of input pictures at an underlying new picture rate;
   generating interpolated pictures from certain ones of the input pictures;
   outputting, at an output frame rate, an output stream including a blend of the new pictures and the interpolated pictures to maintain a particular average interpolated picture rate at which the interpolated pictures appear in the output stream; and
   causing a variation in the average interpolated picture rate in response to detection of a variation in the underlying new picture rate.

2. The image processing method defined in claim 1, further comprising determining the underlying new picture rate on an ongoing basis and detecting variations therein.

3. The image processing method defined in claim 1, further comprising determining the underlying new picture rate.

4. The image processing method defined in claim 3, further comprising generating the interpolated pictures from the new pictures.

5. The image processing method defined in claim 4, wherein generating the interpolated pictures from the new pictures comprises generating, for each of the new pictures, a corresponding subset of R interpolated pictures, where R is an integer greater than or equal to one.

6. The image processing method defined in claim 5, wherein causing the variation in the average interpolated picture rate comprises varying R in accordance with the detected variation in the underlying new picture rate.

7. The image processing method defined in claim 5, wherein causing the variation in the average interpolated picture rate comprises varying the output frame rate in accordance with the detected variation in the underlying new picture rate.

8. The image processing method defined in claim 5, wherein causing the variation in the average interpolated picture rate comprises varying R without varying the output frame rate.

9. The image processing method defined in claim 5, wherein causing the variation in the average interpolated picture rate comprises varying the output frame rate without varying R.

10. The image processing method defined in claim 5, wherein causing the variation in the average interpolated picture rate comprises varying R and varying the output frame rate.

11. The image processing method defined in claim 5, wherein the output stream includes PN copies of each of the new pictures blended with PI copies of each of the interpolated pictures in the corresponding subset of R interpolated pictures, wherein PN and PI are integers greater than or equal to one.

12. The image processing method defined in claim 11, wherein causing the variation in the average interpolated picture rate comprises varying at least one of PN and PI.

13. The image processing method defined in claim 11, wherein causing the variation in the average interpolated picture rate comprises varying R in accordance with the detected variation in the underlying new picture rate.

14. The image processing method defined in claim 11, wherein causing the variation in the average interpolated picture rate comprises varying the output frame rate in accordance with the detected variation in the underlying new picture rate.

15. The image processing method defined in claim 11, wherein causing the variation in the average interpolated picture rate comprises varying at least one of PN, PI and R without varying the output frame rate.

16. The image processing method defined in claim 11, wherein causing the variation in the average interpolated picture rate comprises varying at least one of PN, PI and the output frame rate without varying R.

17. The image processing method defined in claim 1, wherein the underlying new picture rate is identical to the input frame rate.

18. The image processing method defined in claim 1, wherein the underlying new picture rate is different from the input frame rate.

19. The image processing method defined in claim 1, further comprising rendering the output pictures on a display.

20. The image processing method defined in claim 19, wherein the average interpolated picture rate is the rate at which the interpolated pictures are perceived by a viewer of the display.

21. A non-transitory computer-readable storage medium comprising computer-readable instruction for instructing a computing device to:
  receive a stream of input pictures at an input frame rate, at least some of the input pictures being new pictures, the new pictures appearing within the stream of input pictures at an underlying new picture rate that is distinct from the input frame rate;
  generate interpolated pictures from certain ones of the input pictures;
  output, at an output frame rate, an output stream including a blend of the new pictures and the interpolated pictures to maintain at an average interpolated picture rate at which the interpolated pictures appear in the output stream; and
  cause a variation in the average interpolated picture rate in response to detection of a variation in the underlying new picture rate.

22. A non-transitory computer-readable storage medium comprising computer-readable instructions which when processed are used to generate a processor/apparatus adapted to:
  process a stream of input pictures appearing at an input frame rate, a first portion of the input pictures being new pictures and a second portion of the pictures being repeat pictures, the new pictures appearing within the stream of input pictures at an underlying new picture rate;
  generate interpolated pictures from certain ones of the input pictures;
  output, at an output frame rate, an output stream including a blend of the new pictures and the interpolated pictures, the interpolated pictures appearing in the stream of output pictures at an average interpolated picture rate; and
  cause a variation in the average interpolated picture rate in response to detection of a variation in the underlying new picture rate.

23. An image processing engine adapted to implement a frame rate conversion process that comprises:
  circuitry operable to:
  receive a stream of input pictures at an input frame rate, at least some of the input pictures being new pictures, the new pictures appearing within the stream of input pictures at an underlying new picture rate;
  generate interpolated pictures from certain ones of the input pictures;
  output, at an output frame rate, an output stream including a blend of the new pictures and the interpolated pictures, the interpolated pictures appearing in the stream of output pictures at an average interpolated picture rate; and
  cause a variation in the average interpolated picture rate in response to detection of a variation in the underlying new picture rate.

* * * * *